(12) United States Patent
Matsumoto

(10) Patent No.: US 8,107,810 B2
(45) Date of Patent: Jan. 31, 2012

(54) IMAGING DEVICE AND OPTICAL DEVICE

(75) Inventor: Tsuyoshi Matsumoto, Tokyo (JP)

(73) Assignee: Nikon Corporation, Tokyo (JP)

( * ) Notice: Subject to any disclaimer, the term of this patent is extended or adjusted under 35 U.S.C. 154(b) by 46 days.

(21) Appl. No.: 12/259,693

(22) Filed: Oct. 28, 2008

(65) Prior Publication Data

US 2009/0153966 A1    Jun. 18, 2009

Related U.S. Application Data

(63) Continuation-in-part of application No. 12/046,960, filed on Mar. 12, 2008.

(60) Provisional application No. 61/000,737, filed on Oct. 29, 2007.

(30) Foreign Application Priority Data

Mar. 12, 2007 (JP) .................................. 2007-062508
Oct. 31, 2007 (JP) .................................. 2007-283088

(51) Int. Cl.
*G03B 17/48* (2006.01)
*B60R 1/06* (2006.01)

(52) U.S. Cl. ........................................ 396/429; 359/507

(58) Field of Classification Search .................. 396/429; 348/208.7, 340; 359/507, 508
See application file for complete search history.

(56) References Cited

U.S. PATENT DOCUMENTS

| | | | |
|---|---|---|---|
| 2003/0214588 A1* | 11/2003 | Takizawa et al. | 348/207.99 |
| 2003/0214599 A1* | 11/2003 | Ito et al. | 348/335 |
| 2004/0012714 A1* | 1/2004 | Kawai | 348/374 |
| 2006/0279638 A1* | 12/2006 | Matsuda et al. | 348/208.7 |
| 2007/0292126 A1* | 12/2007 | Oshima | 396/429 |

FOREIGN PATENT DOCUMENTS

| | | |
|---|---|---|
| JP | 2003-319222 | 11/2003 |
| JP | 2003-338961 | 11/2003 |
| JP | 2005-020078 | 1/2005 |
| JP | 2006-071851 | 3/2006 |
| JP | 2006-295844 | 10/2006 |
| JP | 2006-343699 | 12/2006 |
| JP | 2007-267189 | 10/2007 |

OTHER PUBLICATIONS

Japanese Office Action for corresponding JP Application No. 2007-062508, Sep. 6, 2011.
English translation of the Japanese Office Action for corresponding JP Application No. 2007-062508, Sep. 6, 2011.

* cited by examiner

*Primary Examiner* — Clayton E LaBalle
*Assistant Examiner* — Noam Reisner
(74) *Attorney, Agent, or Firm* — Ditthavong Mori & Steiner, P.C.

(57) ABSTRACT

An imaging device comprising a light transmissive member 18 having light transmissive character, a vibration member 20 causing bending vibration for the light transmissive member, a driving portion 56 for driving the vibration member 20, wherein the driving portion 56 causes bending vibration of the light transmissive member at a first frequency along with a first direction and causes bending vibration of the light transmissive member 18 at a second frequency along with a second direction which is different from said first frequency.

12 Claims, 13 Drawing Sheets

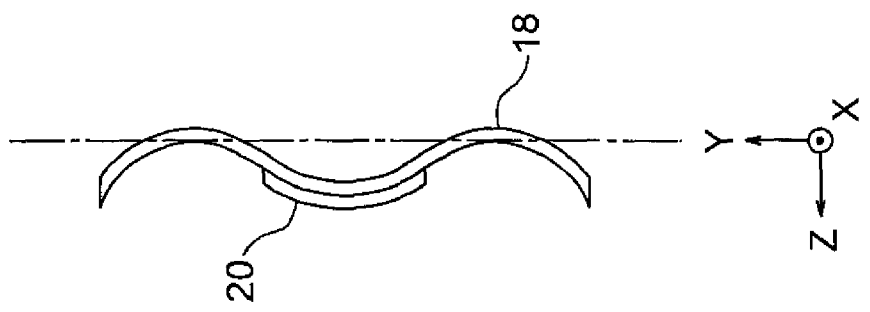
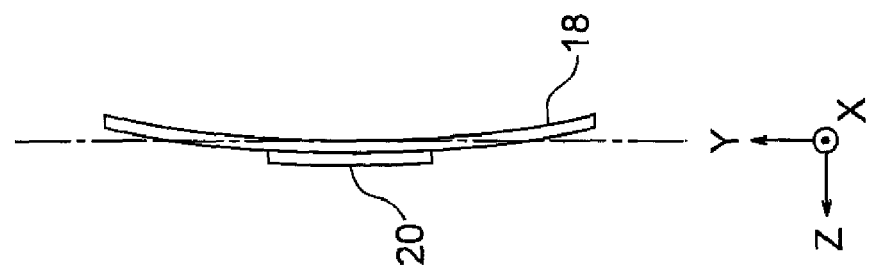
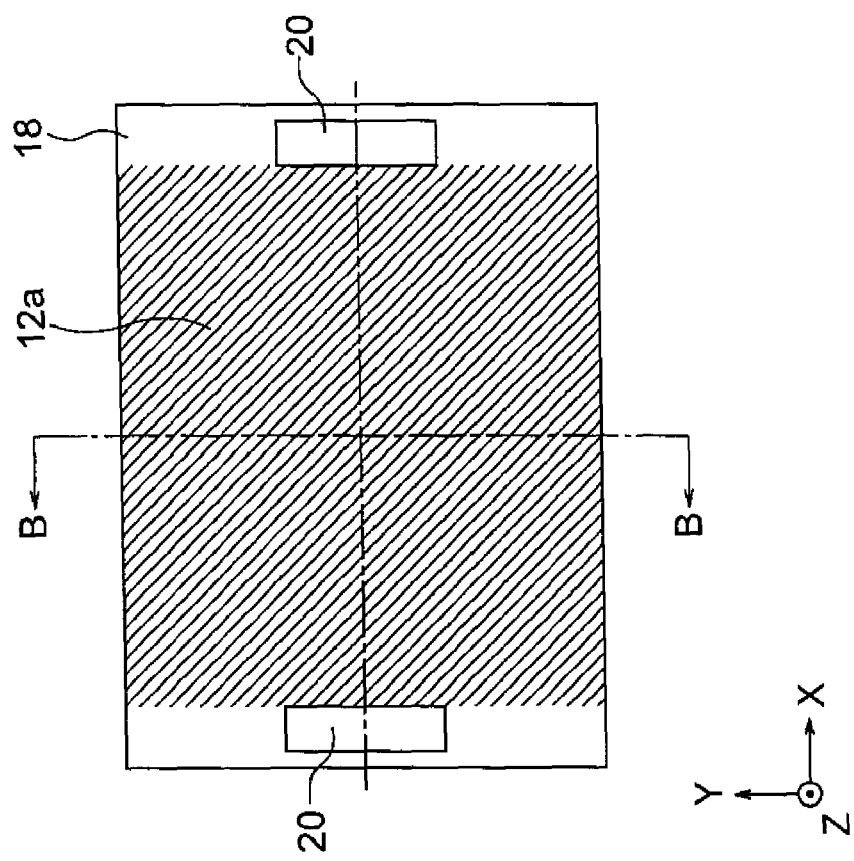

IMAGING DEVICE AND OPTICAL DEVICE

BACKGROUND OF THE INVENTION

1. Field of the Invention

The present invention relates to an imaging device and an optical device.

2. Description of the Related Art

In recent years, in a lens interchangeable digital camera and the like, there are problems such that dust is shown in a taken image due to accretion of the dust on a surface of a filter of an image pick-up element. In order to solve such problems, a system has been developed wherein an anti-dust member is provided between an image pick-up element and an optical system to ensure dust-prevention for the image pick-up element and filters as well as removing the attached dust on the anti-dust member by vibration (refer to JP Patent Publication No. 2003-319222).

However, according to conventional systems, since the anti-dust member is a circular shape, for covering the image pick-up element, an anti-dust member having large size is necessary which is contrary to a requirement for downsizing of the image pick-up device. Also, in the conventional systems, because a vibration mode of the anti-dust member is not considered, it has been difficult to remove the attached dust on a asurface of the anti-dust member effectively.

SUMMARY OF THE INVENTION

The present invention has been made due to considering these circumstances, and a purpose of the invention is to provide an imaging device and an optical device comprising the imaging device having an excellent dust removing capability.

In order to achieve the above purpose, an imaging device of a first aspect of the present invention comprises, a light transmissive member having light transmissive character, provided between an optical system and an image pick-up portion that obtains an image from the optical system, a vibration member that causes bending vibration of said light transmissive member, the vibration member being provided on the light transmissive member, and a driving portion connected electrically to said vibration member so as to drive said vibration member and cause bending of said light transmissive member at a first frequency along with a first direction, and bending of said light transmissive member at a second frequency, which is different from said first frequency, along with a second direction which crosses said first direction.

A method of making an imaging device according to the first aspect of the present invention comprises steps of;

providing a light transmissive member having light transmissive character between an optical system and an image pick-up portion that obtains an image from the optical system, providing a vibration member that causes bending vibration of the light transmissive member on the light transmissive member;

connecting a driving portion electrically to the vibration member so as to drive the vibration member and cause bending of the light transmissive member at a first frequency along with a first direction, and bending of the light transmissive member at a second frequency, that is different from the first frequency, along with a second direction which crosses the first direction.

According to the first aspect of the present invention and a manufacturing method thereof, it is available to remove the attached dust and the like on whole region of a surface of the light transmissive member effectively, by making available to bending vibration not only to the first direction, but also by making available to bending vibration to the second direction.

In order to achieve the above purpose, an imaging device according to a second aspect of the present invention comprises;

a light transmissive member having a surface extends to a first direction and a second direction which is different from said first direction, a vibration member provided on said light transmissive member causing bending vibration of said light transmissive member, and a driving portion for driving said vibration member, wherein:

said driving portion switches between an odd vibration mode which causes bending vibration of said light transmissive member at a bending mode whose number of vibration loops becomes odd number and an even vibration mode which causes bending vibration of said light transmissive member at a bending mode whose number of vibration loops becomes even number;

said odd vibration mode is a bending mode along said first direction; and said even vibration mode is a bending mode along said second direction.

According to a third aspect of the present invention, an imaging device comprises, a light transmissive member provided at an optical system side with respect to an image taking portion to take an image from said optical system, a vibration member provided on said light transmissive member causing bending vibration of said light transmissive member, and a driving portion to drive said vibration member, wherein;

said driving portion switches between an odd vibration mode which causes bending vibration of said light transmissive member at a bending mode whose number of vibration loops becomes odd number and an even vibration mode which causes bending vibration of said light transmissive member at a bending mode whose number of vibration loops becomes even number.

By the imaging device according to the second and the third aspects of the present invention, it is available to remove the attached dust on whole region of a surface of the light transmissive member effectively, by switching between the odd vibration mode and the even vibration mode.

According to the third aspect of the present invention, said odd vibration mode and said even vibration mode may be vibration modes having the same direction along a surface of said light transmissive member.

An optical device according to the present invention comprises the above mentioned imaging device and includes not only a still camera and a video camera, but also optical devices such as a microscope, mobile phone and the like.

BRIEF DESCRIPTION OF THE DRAWINGS

FIG. 5A is a plane view of a light transmissive member shown in FIG. 1; and FIG. 5B and FIG. 5C are cross sectional views of principal part along a line B-B of FIG. 5A.

DESCRIPTION OF THE PREFERRED EMBODIMENTS

First Embodiment

Figure 1:
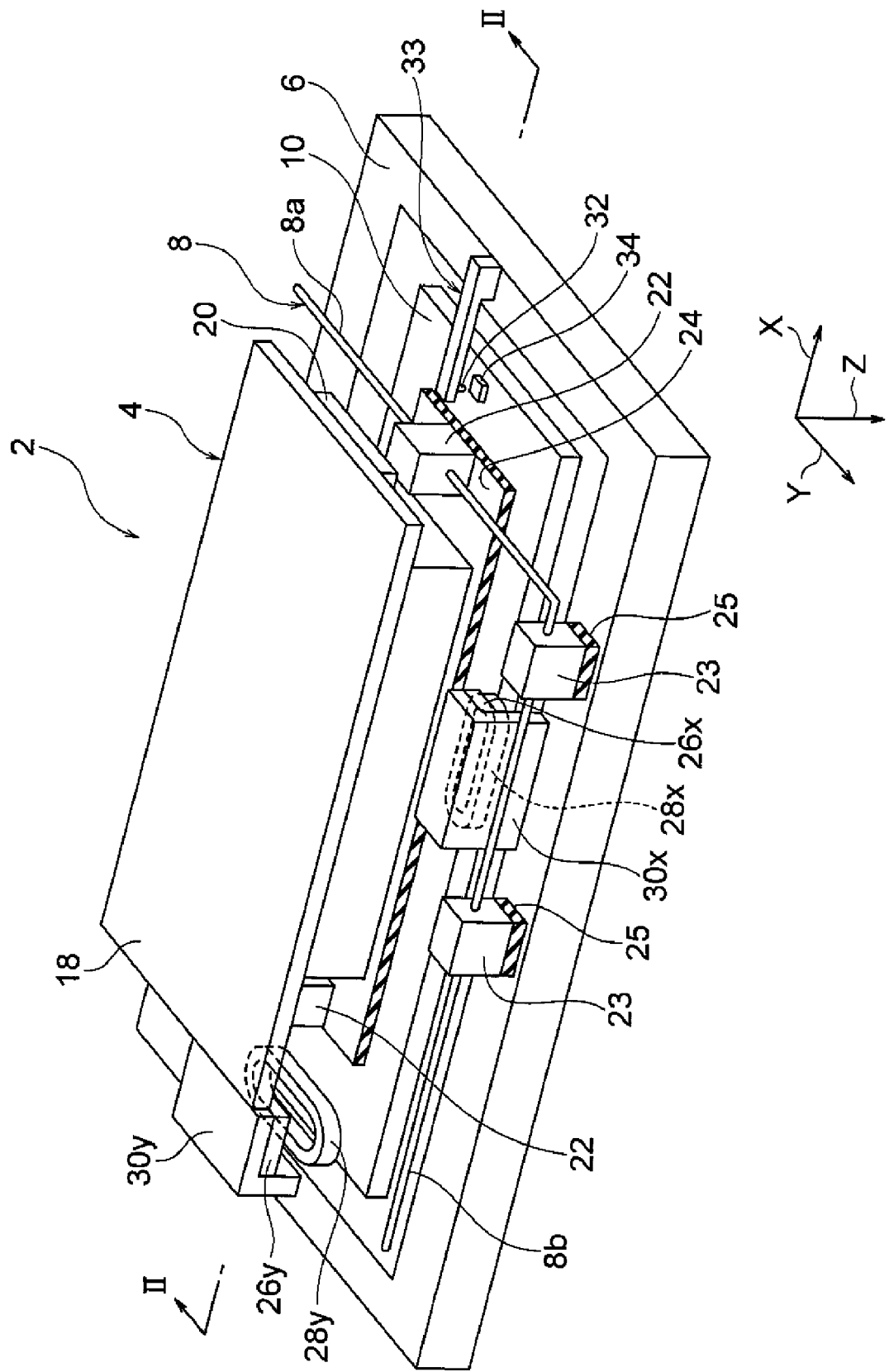
FIG. 1 is a schematic perspective view of an imaging device according to a first embodiment of the present invention.
Figure 2:
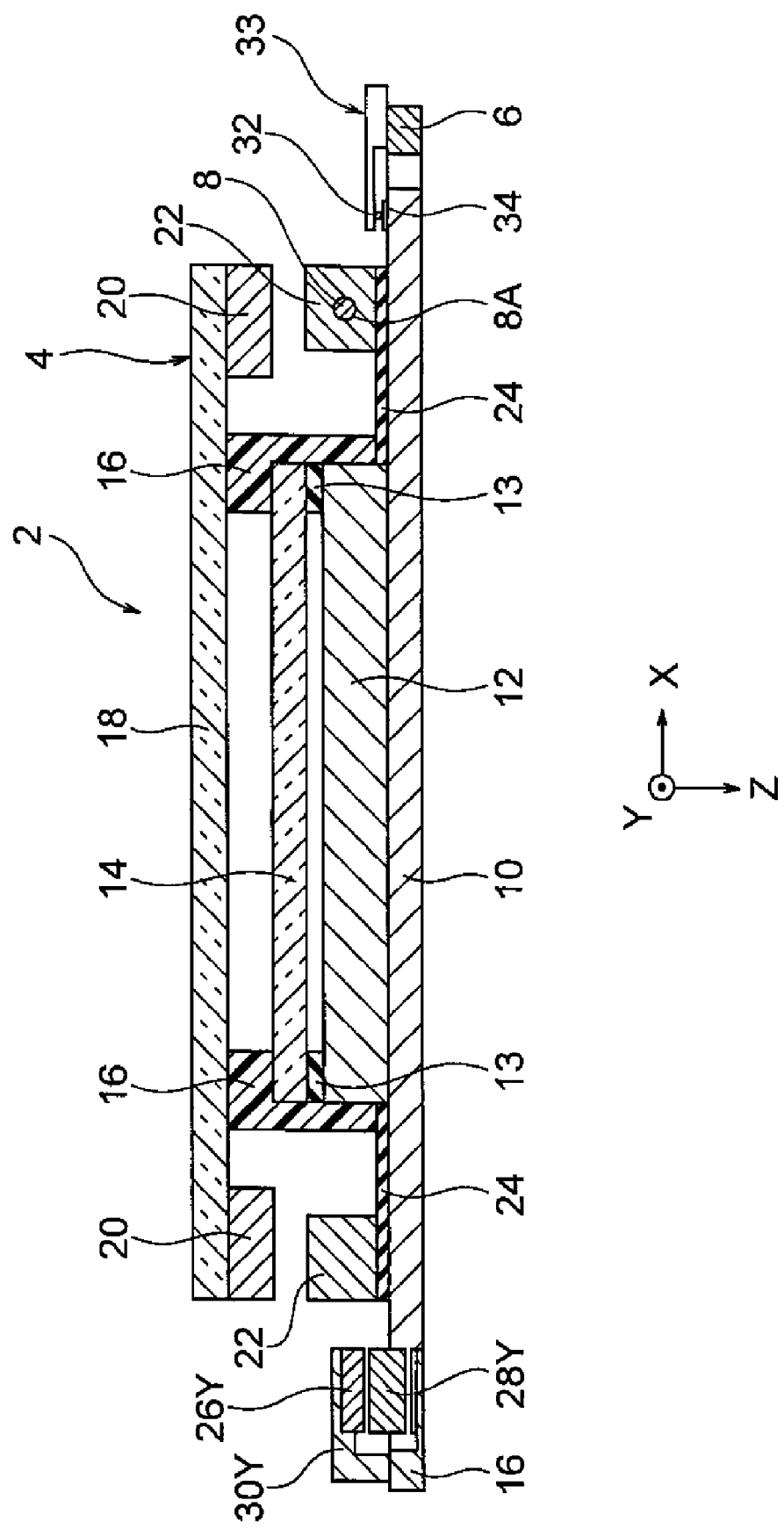
FIG. 2 is a schematic cross sectional view along a line II-II shown in FIG. 1.

As shown in FIG. 1 and FIG. 2, a motion compensation device 2 according to one embodiment of the present invention, wherein an image pick-up element 12 is provided, comprises an image pick-up unit 4 being relatively movable toward X-axis and Y-axis directions with respect to a fixed portion 6. The fixed portion 6 is fixed to a body of camera 40 shown in FIG. 3. The image pick-up unit 4 is arranged movably along with X-axis and Y-axis directions vertical to an optical axis Z direction of optical lens group 48 contained in a lens barrel 42 which is detachably attached to the body of camera 40. Note that the X-axis and Y-axis are vertical.

As shown in FIG. 1 and FIG. 2, the image pick-up unit 4 comprises a movable plate 10 which is movable to the X-axis and the Y-axis directions with respect to the fixed portion 6. The image pick-up element 12 is fixed on a surface of center portion of the movable plate 10, and an optical low-pass filter (OLPE) 14 is provided thereon via a spacer 13. The image pick-up element 12 is an element so as to convert an optical image exposed thereof into an electric signal. The optical low-pass filter (OLPF) 14 is provided for removing so-called moire effect.

A transparent glass plate 18 is arranged on the optical low-pass filter 14 via sealing members 16. By the sealing members 16, a space between the image pick-up element 12 and the optical low-pass filter 14, and a space between the optical low-pass filter 14 and the glass plate 18 are sealed. Namely, the glass plate 18 is a light transmissive antidust member which protects adhering dust on the optical low pass-filter 14 and the image pick-up element 12. In an embodiment shown in drawings, the glass plate 18 includes for example IR (infrared ray) absorbing glass, and glasses other than IR absorbing glass may be used.

In the embodiment shown in drawings, the optical low-pass filter 14 comprises, for example, two crystal birefringent plates and one λ/4 plate (wavelength plates). For example, a proportion of a length along with X-direction and a length along with Y-direction of the glass plate 18 is about same as a proportion of a length along with X-direction and a length along with Y-direction of an image pick-up face of the image pick-up element 12. Thereby, the size of the glass plate 18 can be the most reduced corresponding to the image pick-up face of the image pick-up element 12.

In the present embodiment, the glass plate 18 is formed widely in X-axis direction than the optical low-pass filter 14, each end portions of the glass plate projects from the sealing member 16, and piezoelectric elements 20 as vibration members are attached on upper or lower face of the respective end portions, for example, by adhered agent and the like. The piezoelectric elements are composed, for example, by PZT (lead zirconium titanate) and the like.

On the lower side of the glass plate 18 to which the piezoelectric elements 20 are adhered, guide portions 22 are arranged, and the respective guide portions 22 are fixed to the movable plate 10 via vibration absorption sheets 24. The vibration absorption sheet 24 is a sealing member to seal between the image pick-up element 12 and the sealing member 16 to prevent the dust. Also, in order to decrease effects given by vibration of the piezoelectric element 20 to adhering a connection component of a flexible board or the image pick-up element 12 and a substrate, further, magnets of position detecting sensors and the like, the vibration absorption sheet 24 has a function to make it difficult to carry these vibrations. The vibration absorption sheet 24 is composed by an elastic member such as a rubber sheet and the like, however, adhesive agent having elastic character may be used.

A sliding hole, to which a first axis 8a of a guide rod 8 is inserted, is formed on one of a pair of the guide members 22, and the guide portion 22 is relatively movable toward Y-axis direction along with the first axis 8a. The guide rod 8 is formed as an about L-shape and comprises a second axis 8b which is vertically bended to the first axis 8a. The second axis 8b passes through insertion holes formed on the two guide portions 23, 23, by these guide portions 23, 23, it is kept relatively movable along with X-axis direction. These guide portions 23, 23 are fixed to the fixed portion 6 via vibration absorption sheets 25. Namely, in the image pick-up element unit 4, relative movements of X-axis direction and Y-axis direction to the fixed portion 6 are guided by the guide rod 8, and also rotation around z-direction (θ direction) is prevented.

The fixed portion 6 is arranged so that the image pick-up element unit 4 is surrounded by the fixed portion, a yoke 30x, which holds a permanent magnet 26x to move the image pick-up element 4 to X-axis direction on the fixed portion 6, is fixed at one side position of X-axis direction in the fixed portion 6. A coil 28x, which is fixed to the movable plate 10 in the image pick-up element unit 4, faces the permanent magnet 26x, and by electric controlling of the coil 28x, the image pick-up element unit 4 can be controlled movably to X-axis direction via the movable plate 10. Namely, the coil 28x and the permanent magnet 26x constitute a voice coil motor (VCM) as X-axis direction moving means. Note that as X-axis direction moving means, it is not limited to the VCM, and other actuators may be used.

Also, at one side position of Y-axis direction in the fixed portion 6, a yoke 30y, which holds a permanent magnet 26y to move the image pick-up element 4 to Y-axis direction on the fixed portion 6, is fixed at one side position of Y-axis direction to the fixed portion 6. A coil 28y, which is fixed to the movable plate 10 in the image pick-up element unit 4, faces the permanent magnet 26y, and by electric controlling of the coil 28y, the image pick-up element unit 4 can be controlled movably to Y-axis direction via the movable plate 10. Namely, the coil 28y and the permanent magnet 26y constitute a voice coil motor (VCM) as Y-axis direction moving means. Note that as Y-axis direction moving means, it is not limited to the VCM, and other actuators may be used.

In order to detect a relative moving position of the image pick-up element unit 4 to the fixed portion 6, a position sensor 33 is installed on the fixed portion 6. The position sensor 33 comprises a hall element 32, and a permanent magnet 34 is equipped on a surface of the movable plate 10 at a position corresponding to the hall element 32. By moving the permanent magnet 34 with the movable plate 10 to X-axis and Y-axis directions, moving amounts of the X-axis and Y-axis directions are detected by the position sensor 33. Note that the position sensor 33 as a detecting portion, is not limited to magnetic sensor, and may be PSD (Position sensitive detector) and optical sensor.

Figure 3:
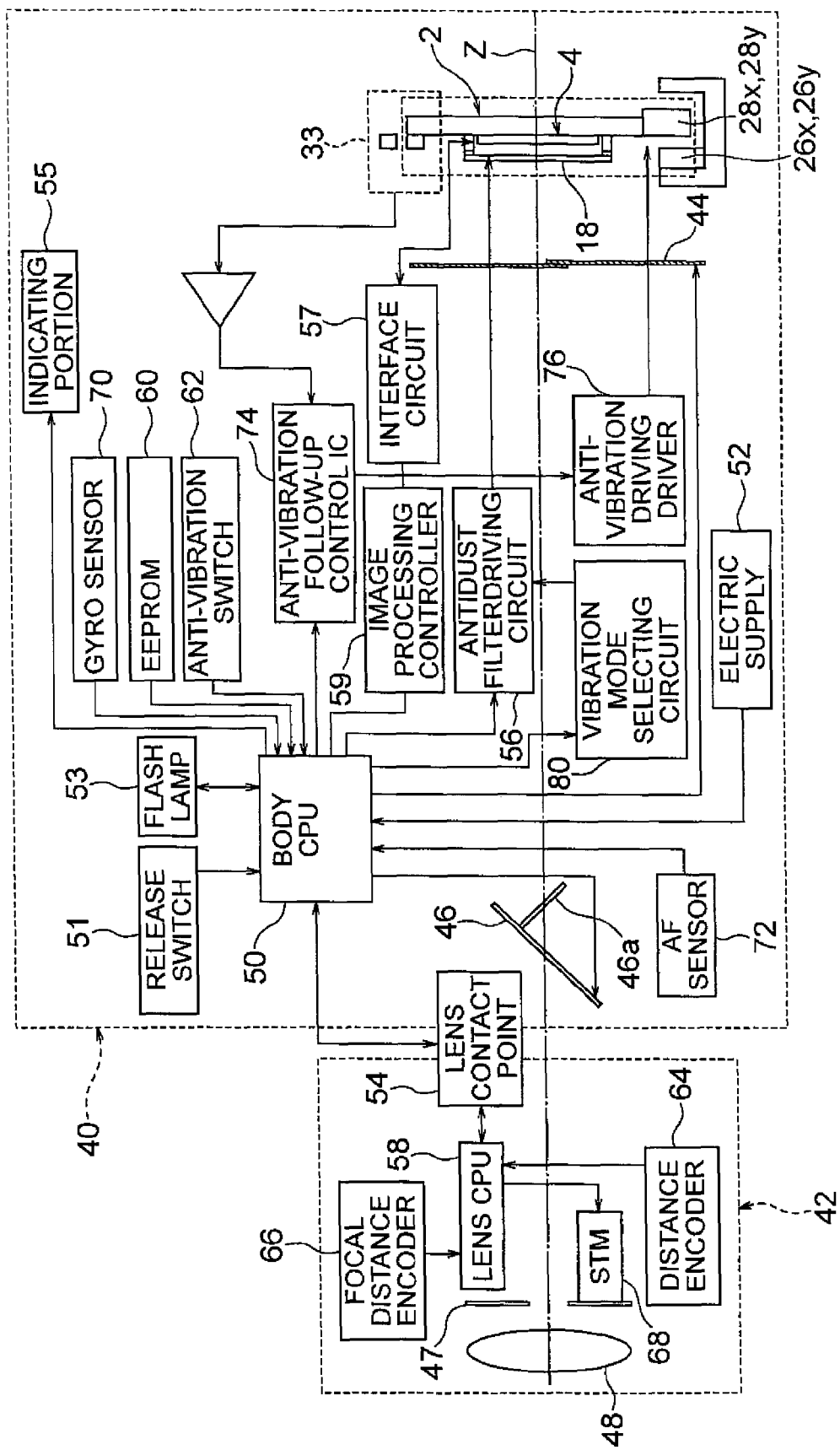
FIG. 3 is a block diagram of a whole camera.

Next, a whole camera will be specified on the basis of FIG. 3. The motion compensation device 2 having the image pick-up element unit 4 shown in FIGS. 1 to 3 is arranged in a camera body 40 so that the glass plate 18 of the image pick-up element unit 4 is being perpendicular to an optical axis Z. The glass plate 18 is parallel to the optical low-pass filter 14 and the image pick-up element 12 shown in FIG. 2.

As shown in FIG. 3, a lens barrel 42 is equipped detachably to the camera body 40. Note that in compact camera and the like, there are a camera in which the lens barrel 42 and the camera body 40 are integral, and in the present invention, types of camera are not limited particularly. Also, it can be applied to not only a still camera, but also optical devices such as a video camera, a microscope, mobile phone and the like. In following explanation, for making explanation easily, it will be explained about a single lens reflex camera in which the lens barrel 42 and the camera body 40 are detachable.

In the camera body 40, a shutter member 44 is arranged in front of Z-axis direction of the image pick-up unit 4. A mirror 46 is arranged in front of the Z-axis direction of the shutter member 44, and a diaphragm 47 and an optical lens group 48 contained within the lens barrel 42 are arranged in front of the Z-axis direction thereof.

A body CPU 50 is contained within the camera body 40 and is connected to a lens CPU 58 via a lens contact 54. The lens contact 54 causes electrically connecting the body CPU 50 and the lens CPU 58 by connecting the lens barrel 42 with the cameral body 40. A power supply 52 is connected with the body CPU 50. The power supply 52 is contained within the camera body 40.

A release switch 51, a flash lamp 53, an indicating portion 55, a gyro sensor 70, EEPROM (memory) 60, an anti-vibration switch 62, an antidust filter driving circuit 56, an image processing controller 59, AF sensor 72, an anti-vibration follow-up control IC 74 and the like are connected to the body CPU 50. The image pick-up element 12 of the image pick-up element unit 4 (refer to FIG. 3) is connected with the image controller 59 via an interface circuit 57, and the image controller 59 enables to control an image processing taken by the image pick-up element 12.

The body CPU 50 comprises a communication function with the lens barrel 42 and a control function of the camera body 40. Also, the body CPU 50 outputs an anti-vibration driving portion target point to the anti-vibration follow-up control IC 74. The anti-vibration driving portion target point is calculated from information input from EEPROM 60, a blurring angle calculated by receiving an output from the gyro sensor 70, focal distance information and distance information. Also, a blurring angle is derived by the body CPU 50 according to integrating an angular velocity of the gyro sensor 70 which inputs a sensor output through an amplifier not shown in figures to the body CPU 50.

Also, the body CPU conducts a communication whether the lens barrel 42 is equipped completely, and calculates a target position from a focal distance, distance information input from the lens CPU 58 and the gyro sensor. When a release switch 51 is pressed halfway, the body CPU outputs a command for operation of preparing to capture an image such as vibration control driving and the like in response to AE, AF and conditions to the lens CPU 58 and the vibration follow-up control IC 74. When the release switch is fully pressed, the body CPU outputs commands for mirror drive, shutter drive, diaphragm drive and the like.

The indicating portion 55 is composed of, mainly, a liquid crystal display device and the like, which displays output results, menu and the like. The release switch 51 is a switch for operating timing of shutter driving, which outputs a condition of the switch to the body CPU 50. When the release switch 51 is pressed halfway, operates AF, AE and anti-vibration driving depending on a situation. When the switch is fully pressed, it operates mirror-up, shutter drive and the like.

The mirror 46 is for showing an image to a finder at decision of picture composition, which eliminates from an optical line during exposure. Information of the release switch 51 is input from the body CPU 50, it operates mirror-up when fully pressed and mirror down after exposure is finished. The mirror 46 is driven by a mirror driving portion (for example, DC motor) which is not shown in figures. A sub-mirror 46a is connected with the mirror 46.

The sub-mirror 46a is a mirror for transmitting light to an AF sensor which introduces light beam through the mirror to the AF sensor by reflection. The sub-mirror 46a eliminates from the optical line during exposure.

A shutter member 44 is a mechanism to control an exposure time. Information of the release switch 51 is input from the body CPU 50, when the switch fully pressed, it operates shutter driving. The shutter member 44 is driven by a shutter driving portion (for example, DC motor) which is not shown in figures.

The AF sensor 72 is a sensor for conducting Auto focusing (AF) As the AF sensor, normally, a CCD is used. An anti-vibration switch 62 outputs anti-vibration ON or OFF status to the image pick-up element unit CPU. The gyro sensor 70 detects angular velocity of blurring occurred at the body and outputs to the body CPU 50. The EEPROM 60 comprises information such as gain value and angle adjustment value of the gyro sensor and outputs to the body CPU.

The antidust filter driving circuit 56 is connected with the piezoelectric elements 20 shown in FIG. 1 and FIG. 2, and when predetermined conditions are satisfied, the circuit drives the piezoelectric elements 20 for vibrating the glass plate 18 to act an operation for removing dust and the like adhered on the surface of the glass plate 18, as shown in FIG. 4B, FIG. 4C or FIG. 5B and FIG. 5C.

For example, to the piezoelectric elements 20, electric voltage such as periodic rectangular wave or sine wave and the like are applied. In this manner, according to applying periodic electric voltage to the piezoelectric elements 20 by controlling the antidust driving circuit 56, the glass plate 18 is vibrated. When an inertia force received from the glass face exceeds an adherence of the dust, the dust comes off from the glass face.

Preferably, as for the periodic driving of the piezoelectric elements 20, it is preferable to drive the piezoelectric elements 20 with a vibration frequency so as to resonate a surface of the glass plate 18, in order to obtain preferably large amplitude by low voltage. A resonate frequency is determined by a shape, material, manner of support and vibration mode. It is preferable to support the glass plate 18 at a node position at which amplitude becomes 0.

In the present embodiment, a vibration mode selecting circuit 80 is connected with the antidust filter driving circuit 56. The vibration mode selecting circuit 80 controls the antidust filter driving circuit 56 via the body CPU 50. Details of control by the vibration mode selecting circuit 80 will be mentioned below.

The vibration follow-up control IC 74 is IC for vibration control. The IC calculates an anti-vibration driving portion moving amount from an anti-vibration driving portion target point input from the body CPU 50 and an anti-vibration driving portion position information input from a position detecting portion, and outputs the moving amount to an anti-vibration driver 76. Namely, a position signal of the image pick-up element unit from the position sensor 33 and an output signal from the body CPU 50 are input to the anti-vibration follow-up control IC 74. In the body CPU 50, the anti-vibration driving portion target position is calculated from an angle of blurring calculated by receiving an output of the gyro sensor 70, a focal distance information detected by a focal distance encoder, a distance information detected by a distance encoder 64 and the like, and the anti-vibration driving portion target position is output to the anti-vibration follow-up control IC 74.

The anti-vibration driver 76 is a driver for controlling an anti-vibration driving portion to control a driving direction and a driving amount of the anti-vibration driving portion by receiving an input of driving amount from the anti-vibration follow-up control IC. Namely, the anti-vibration driver 76 sends driving current to the coils 28x and 28y based on the input information from the anti-vibration follow-up control IC 74, and causes to move the image pick-up element unit 4 to X-axis and Y-axis directions against the fixed portion 6, and thereby a motion compensation control is made.

In the lens barrel 42 as shown in FIG. 3, the focal distance encoder 66, a distance encoder 64, a diaphragm portion 47, a driving motor 68 for controlling a diaphragm portion 47, the lens CPU 58, a lens contact point 54 with a body portion and a plurality of lens group 48 are equipped. In the lens contact 54, there are a contact point for supplying a lens driving system power from the camera body 40, a contact point of a CPU power supply for driving the lens CPU 58 and a contact point for digital communication.

The driving system power supply and the CPU power supply are supplied from the power supply 52 of the camera body 40 to provide electric power for the lens CPU 58 and the driving system. The digital communication contact point conducts communication to input digital information output from the lens CPU 58, such as a focal distance, a subject distance and a focal position information and the like to the body CPU 50, and conducts communication to input digital information output from the body CPU 50, such as a focal position information and a diaphragm amount and the like to the lens CPU 58. The lens CPU 58 operates to control AF and diaphragm by receiving the focal position information and the diaphragm amount information from the body CPU 50.

The focal distance encoder 66 determines the focal distance from position information of a zooming lens group. Namely, the focal distance encoder 66 encodes the focal distance and outputs it to the lens CPU.

The distance encoder 64 determines the subject distance from position information of a focusing lens group. Namely, the distance encoder 64 encodes the subject distance and outputs it to the lens CPU.

The lens CPU comprises a communication function with the camera body 40 and a controlling function for the lens group 48. The focal distance and the subject distance and the like are input to the lens CPU, which are output to the body CPU 50 via the lens contact 54. Release information and AF information are input from the body CPU 50 to the lens CPU 58, via a lens contact 54.

Figure 4A:
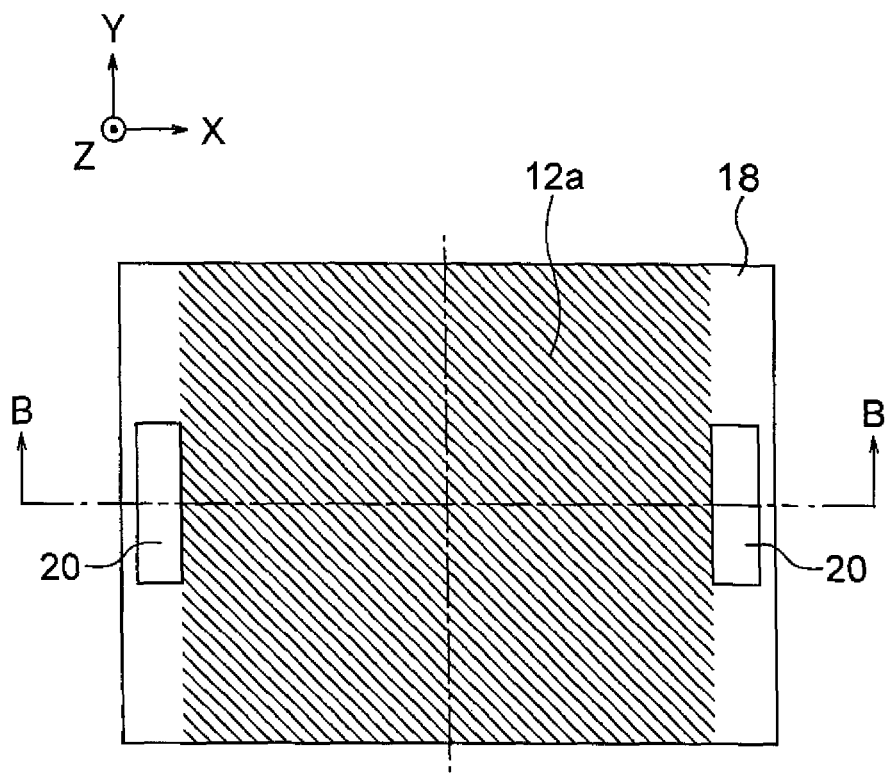
FIG. 4A is a plane view of a light transmissive member shown in FIG. 1.

Next, a vibration mode of the glass plate 18 by the piezoelectric elements 20 on the basis of mainly FIG. 3 to FIG. 5.

Figure 4B:
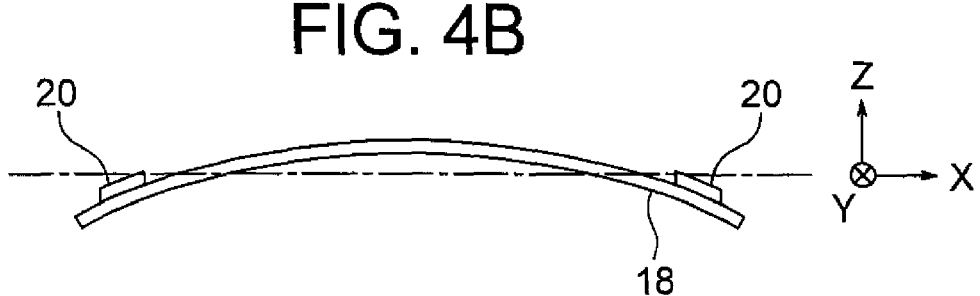
FIG. 4B and FIG. 4C are cross sectional views of principal part along a line B-B of FIG. 4A.

In the present embodiment, a signal is transmitted from the vibration mode selecting circuit 80 shown in FIG. 3 to the antidust filter driving circuit 56, for example as shown in FIG. 4B, to vibrate the glass plate 18 at a first vibration mode along with the X-axis direction. In the case of the glass plate's 18 dimension is 20 mm wide, 28 mm high and 0.4 mm thick, and the piezoelectric element's 20 dimension is 4 mm wide, 12 mm high and 0.5 mm thick, a vibration frequency of the first vibration mode shown in FIG. 4B is, for example, about 1260 Hz. Although FIG. 4B shows a condition that the glass plate 18 is upwardly convex, in fact, the plates vibrate by alternately repeating upwardly convex and downwardly convex.

Figure 4C:
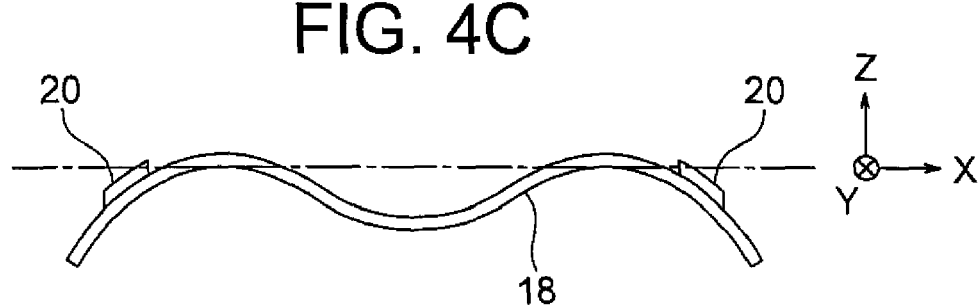

A vibration frequency of a second vibration mode (not shown) along with the X-axis direction (a longitudinal direction) of the glass plate 18 is, for example, about 3790 Hz, and a vibration frequency of a third vibration mode shown in FIG. 4C is, for example, about 7689 Hz. Also, as shown in FIG. 5B, a vibration frequency of a first vibration mode along with the Y-axis direction (a lateral direction) is, for example, about 3700 Hz, and a vibration frequency of a third vibration mode shown in FIG. 5C is, for example, about 16500 Hz.

Although these vibration modes are realized by driving a pair of piezoelectric elements 20 arranged at center portion of both ends of the X-axis direction at the glass plate 18 under predetermined frequency, in some cases, each piezoelectric element 20 may be arranged at all sides of the glass plate 18, respectively.

However, as in the present embodiment, by arranging piezoelectric elements 20 at center position of both ends of the X-axis direction in the glass plate 18, a portion to be used effectively (a portion where the image pick-up element is arranged) can be made large without increasing size of the glass plate 18. Also, in the present invention, a plurality of vibration modes may be realized by arranging a piezoelectric element 20 at only one position of the all sides of the glass plate 18.

In the present embodiment, vibration modes occur on the glass plate 18 shown in FIG. 4 and FIG. 5 by controlling the antidust driving circuit 56 on the basis of the vibration mode selecting circuit 80 shown in FIG. 3. The vibration mode is preferably switchable to a plurality of vibration modes by considering an occurred velocity (dust removing force) and a node position. Note that, the dust removal tends to be insufficient at a position of node of the vibration in the glass plate 18 due to not vibrating. Therefore, by changing a vibration mode of the piezoelectric element 20 according to changing a driving vibration frequency so as to change a node position of vibration of the glass plate, it will be possible to remove dust at whole area of the glass plate 18.

For example, as shown in FIG. 4B, in case that sufficient dust removal effect cannot be obtained by the first bending vibration mode along with the X-axis direction only, following control will be operated. Namely, a control signal is transmitted from the vibration mode selecting circuit 80 shown in FIG. 3 to the antidust filter driving circuit 56, and the driving frequency of the piezoelectric element 20 is set higher as shown in FIG. 4C, in order to vibrate the glass plate 18 under a third bending vibration mode. In this case, further dust removal effect can be obtained.

Further, a control single is transmitted from the vibration mode selecting circuit 80 shown in FIG. 3 to the antidust filter driving circuit 56, and the glass plate 18 may be vibrated under the first to the third bending vibration modes along with the Y-axis direction, as shown in FIG. 5B and FIG. 5C. Further, it is possible to use a combination of a higher level bending vibration mode at the both X-axis and Y-axis directions. Furthermore, it is possible to control by different bending vibration modes repeatedly, which can increase dust removal effect. Also, for example, by suitably changing the vibration modes of the X-axis and the Y-axis, dust on the glass face may be moved from a center portion of the glass face to an end portion thereof.

On the other hand, according to a limitation such as cost for driving circuit and the like, in case that the above wide scope driving frequency (1260 to 16500 Hz) cannot be used, a second bending vibration mode (3790 Hz) along with the X-axis direction and the first bending vibration mode (about 3700 Hz) along with the Y-axis direction may be used. In this case, since the vibration modes can be changed by small frequency changing, a necessary frequency scope becomes smaller, and it is possible to compose driving circuits easily with low cost.

Also, in the present embodiment, by adjusting the driving frequency applied to the piezoelectric element 20, a favorable excitation in conformity with an aspect ratio of a rectangular glass plate 18 becomes available. Also, by adjusting a timing of the bending vibration along with the X-axis direction and the bending vibration along with the Y-axis direction appropriately, a favorable excitation in conformity with an aspect ratio of the rectangular glass plate 18 becomes available.

Further, in the present embodiment, by differing "timing" and/or "frequency" of the bending vibration along with the X-axis direction and the bending vibration along with the Y-axis direction, it will be hard to interfere with the vibration of the X-axis direction and the vibration of the Y-axis direction.

Furthermore, in the present invention, by causing bending vibration of a transmissive member under a plurality of vibration modes along with at least one of the X-axis direction and the Y-axis direction, a node position of vibration and a loop position of vibration are replaced, and a position not vibrating constantly (a node position constantly) is decreased. For this reason, dust adhering area becomes decreased. Note that, in the above mentioned embodiment, although the explanation has been made by using an imaging device which operates blurring compensation by moving the image pick-up element, it is not limited to this. For example, it may be either an imaging device which operates blurring compensation by moving lens or an imaging device which has no blurring compensation function.

Second Embodiment

Whole composition of the camera of the present embodiment is similar with the first embodiment shown in FIG. 3, therefore, overlapped explanation will be omitted.

Figure 6:
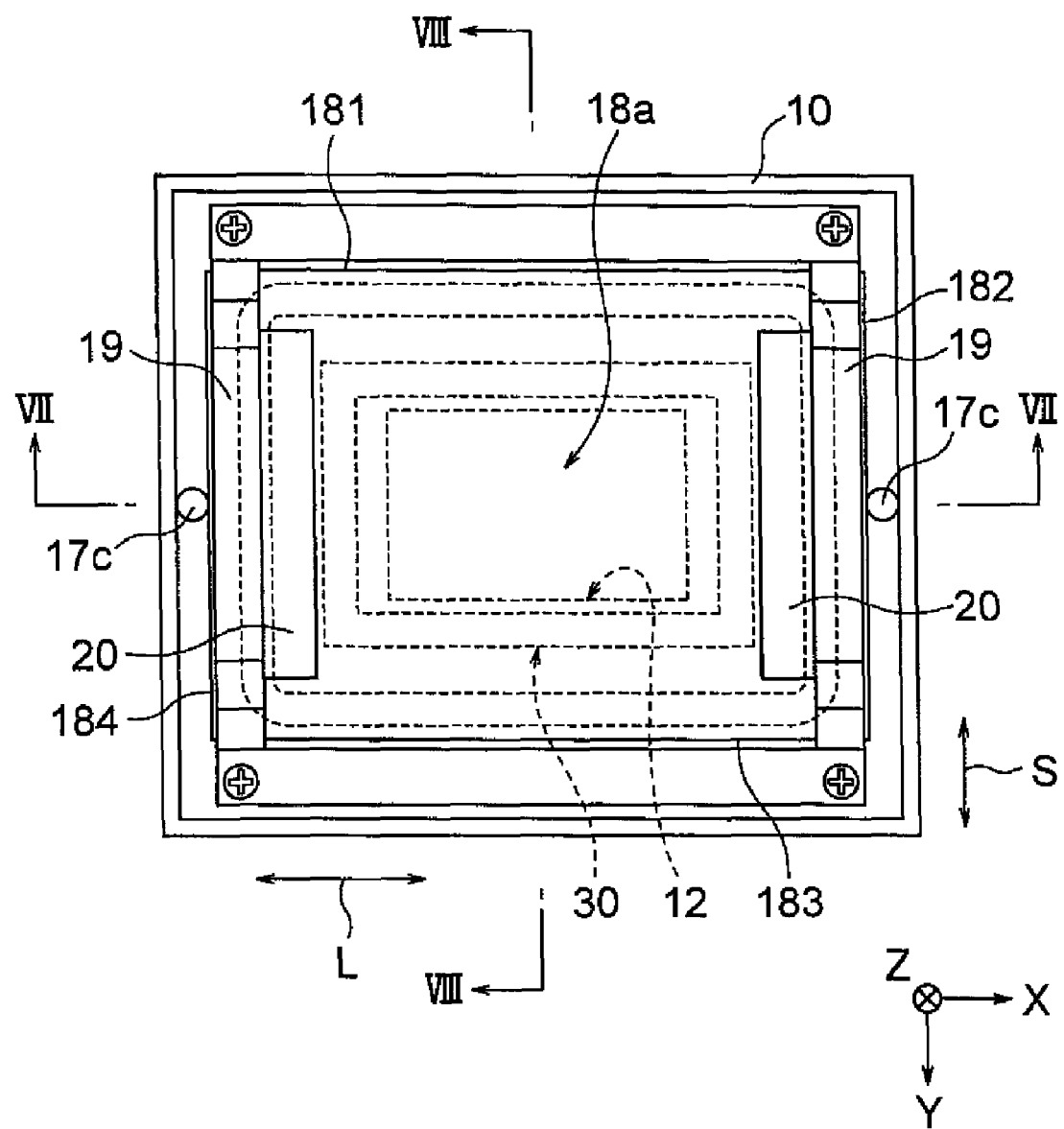
FIG. 6 is a plane view of an imaging device according to other embodiments of the present invention.
Figure 7:
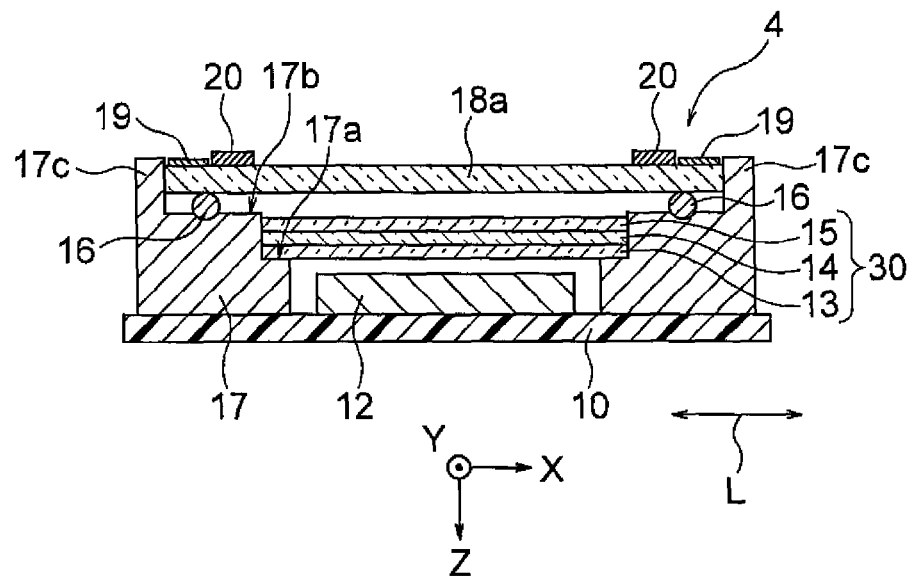
FIG. 7 is a schematic cross sectional view along a line VII-VII shown in FIG. 6.
Figure 8:
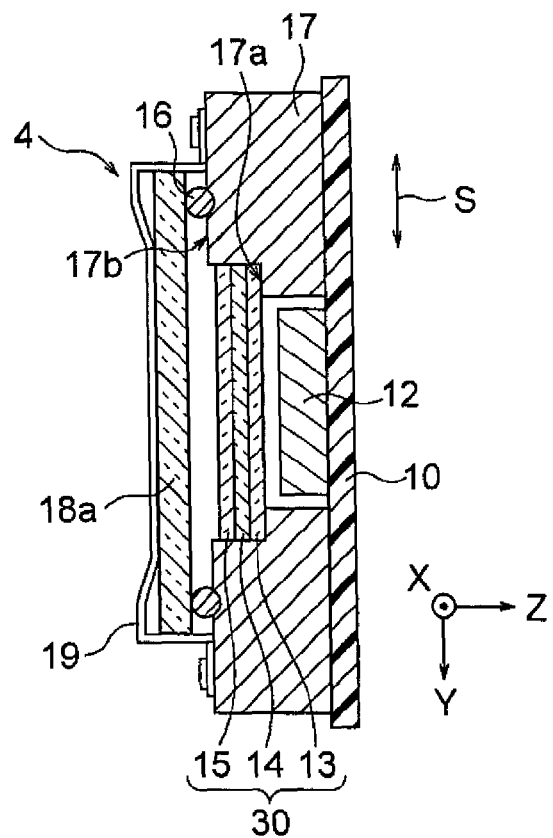
FIG. 8 is a schematic cross sectional view along a line VIII-VIII shown in FIG. 6.

As shown in FIG. 6 to FIG. 8, the image pickup element unit according to the present embodiment includes a substrate 10, and the image pickup element 12 is fixed on an upper face of center portion of the substrate 10. A case 17 is arranged at a circumference of the image pickup element 12, the case is detachably or not detachably fixed to a surface of the substrate 10.

The case 17 is composed of an insulating body, for example, such as synthetic resin or ceramic and the like, and an inner circumferential side attaching portion 17a and an outer circumferential side attaching portion 17b are formed at an upper face thereof in a step-like pattern. An outer circumference of optical member elements 30 having light transmissive property is attached to the inner circumferential side attaching portion 17a. As a result, a circumference of the image pickup element 12 is hermetically sealed by the substrate 10, the case 17 and the optical member elements 30.

The crystal plate 18a is provided at the outer circumferential side attaching portion 17b of the case 17 via a hermitic sealing member 16, and compressed to the hermetic sealing member 16 by a pressing member 19. Here, a metal plate is used as the pressing member 19, the crystal plate 18a is biased to the hermetic sealing member 16 direction by an elastic force due to deformation of the pressing member 19.

The crystal plate 18a is provided as its longitudinal direction L and a short side direction S are about perpendicular to the optical axis Z. The optical member element 30 is provided to be about parallel to the crystal plate 18a.

As a result, a storage space in which the image pickup element 12 and the optical member element 30 are provided becomes hermetic sealing, it is possible to prevent entering of dust from outside of the case 17 to the storage space. The pressing member 19 is detachably fixed on the upper face of the case 17 by, for example, bis fixture, positioning of a long side direction of a rectangular shape crystal plate 18a is made by positioning-pin 17c formed on the upper face of the case 17. Note that, the hermetic sealing member 16 is composed of material having low rigidity, for example, such as foamed resin, rubber and the like so as not to prevent the vibration movement of the crystal plate 18a which will be mentioned below, with securing hermetic sealing.

In the present embodiment, the optical member element 30 is a layered structure of a plurality of optical plates which is composed of a layered plate of a crystal plate 13, an infrared ray absorbing glass plate 14 and a crystal wavelength plate 15 ($\lambda/4$ wavelength plate). The optical member element 30 composed of the layered plate has a small area with respect to the crystal plate 18a, and further, is a larger area with respect to a plain face side area of the image pickup element 12, which covers the whole image pickup element 12.

The crystal wavelength plate 15 is available to change lineally polarized light to circular polarized light, and the infrared ray absorbing glass plate 14 has a function to absorb an infrared ray. Also, the crystal plate 13 whose birefringence direction is different at 90° mutually with respect to the crystal plate 18a, in case that one is a crystal plate has 90° direction (short side direction) birefringence, the other crystal plate includes 0° direction (long side direction) birefringence. In the present embodiment, the crystal plate 18a has 0° direction (long side direction) birefringence and the crystal plate 13 has 90° direction (short side direction) birefringence.

Namely, in the present invention, an optical low pass filter (OLPEF) is composed basically, by two crystal plates 13 and 18a arranged as spaced each other. Note that, generally, the infrared ray absorbing glass plate 14 and the crystal wavelength plate 15 are fully layered between the two crystal plates 13 and 18a to compose the optical low pass filter (OLPF).

In the present embodiment, the two crystal plates 13 and 18a are arranged as spaced at an inside of the case 17. Particularly, with respect to the crystal plate 18a arranged at an outer side of the case 17, a crystal plate which is cut out with a specific angle (θ=+45°) from Z-axis of a berg crystal is used. The berg crystal may be artificial quartz or may be natural quartz crystal.

The berg crystal includes γ-axis which is a crystal growth axis and α-axis and β-axis which are mutually perpendicular respectively to the γ-axis. The α-axis means, for example, an electric axis which is perpendicular to the γ-axis. The β-axis means, for example, a mechanical axis which is perpendicular to the y-axis. In the present embodiment, a flat plate to be cut out so that a face with an angle of θ=substantially +45° towards clockwise direction of an arrow of the α-axis to the γ-axis of the berg crystal 18a is a plain face, is used as the crystal plate 18a.

Note that, in the present embodiment, the angle substantially +45° includes fluctuated angles from +45°. For example, if the fluctuation is ±3° against the +45°, sufficient effects can be obtained. Further, the angle of θ is plus value means an angle of clockwise direction to the arrow of the α-axis to the γ-axis and the angle of the opposite direction is expressed by minus value.

In the present embodiment, as similar with the crystal plate 18a, a crystal plate 13 which constitutes one part of the optical member element 30 may be a flat plate cut out from the berg crystal so that a face with an angle of θ=substantially +45° from the berg crystal becomes a surface of the flat plate or a flat plate cut out at other angle. However, it is preferable that a birefringence direction of the crystal plate 13 differs at 90° to the crystal plate 18a. This is in order to function as OPLF effectively and to protect the moire phenomenon.

The crystal plate 18a composed of a flat plate cut out from the berg crystal in a direction θ=+45° differs an elastic coefficient and has lower bending rigidity, and the resonant frequency is substantially 20% lower as compared from a crystal plate composed of a flat plate cut out at θ=−45°. A thickness of the crystal plate 18a is designed most appropriately corresponding to a pixel pitch of the image pickup element, and for example, it is same thickness of the crystal plate 13.

As shown in FIG. 6 and FIG. 7, a pair of piezoelectric elements 20 as vibration members are adhered on the front surface of the crystal plate 18a (an outer face to the case 17) at both side position along the long side direction L of the rectangular crystal plate 18a so as to extend parallel to the α-axis direction of the berg crystal. The piezoelectric elements 20 are composed of, for example, PZT elements. Note that, a shape of the crystal plate 18a may be a square or other shape which is not limited to the rectangular shape.

Figure 16:
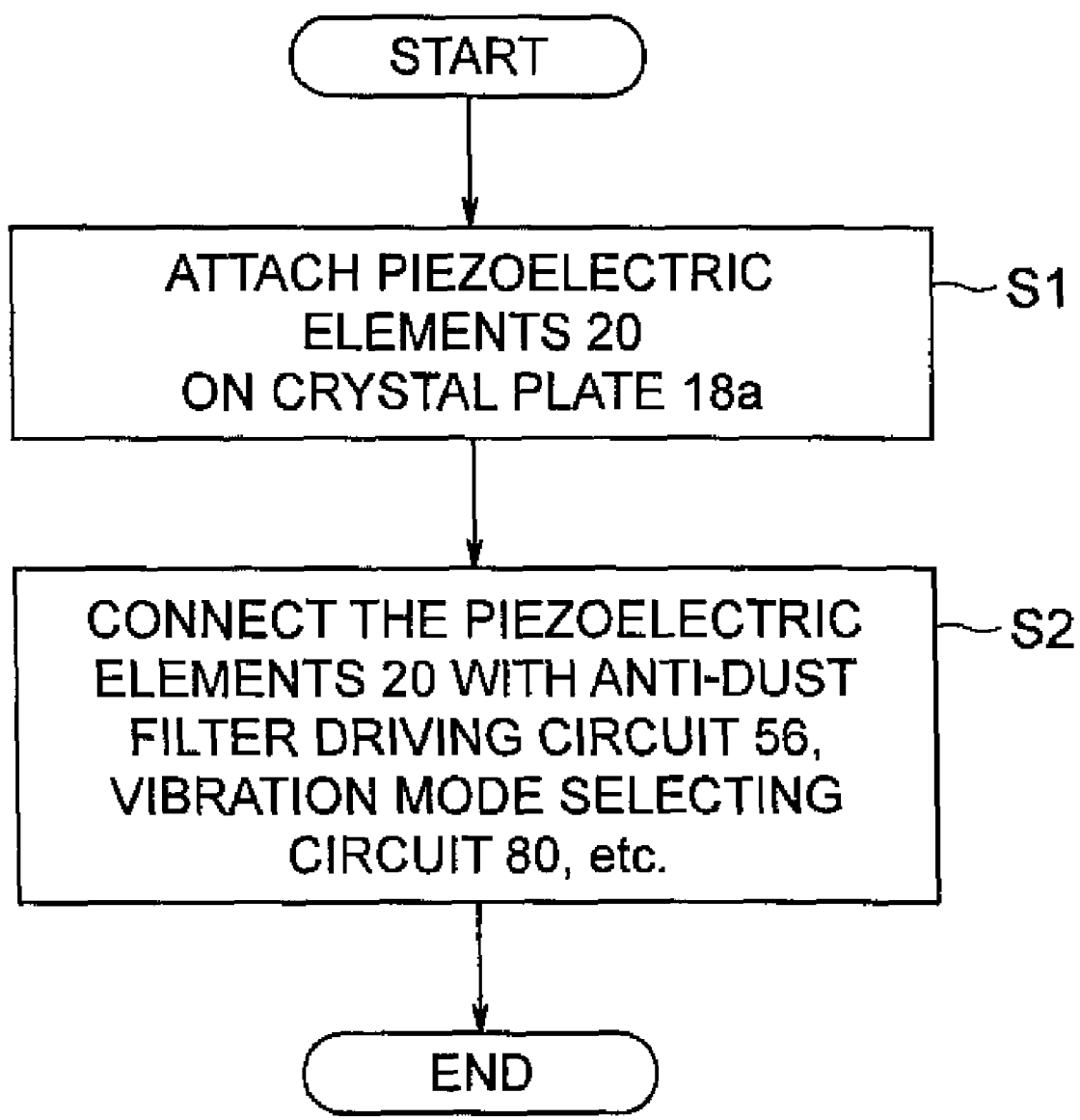
FIG. 16 is a flow chart showing manufacturing process of an imaging device according to one embodiment of the present invention.

As shown in FIG. 16, the imaging apparatus shown in FIG. 6 and FIG. 7 may be made by, for example, following process. First, in a step S1, a first piezoelectric element 20 is equipped adjacent to a first side 182 which is in parallel to the X-axis of the crystal plate 18a, and a second piezoelectric element 20 is equipped at adjacent to a second side 184 positioned at an opposite side of the first side 182.

Next, in a step S2, circuits such as the antidust filter driving circuit 56 and the vibration mode selecting circuit 80 and the like shown in FIG. 3 to electrically connect the first and the second piezoelectric elements.

Figure 9A:
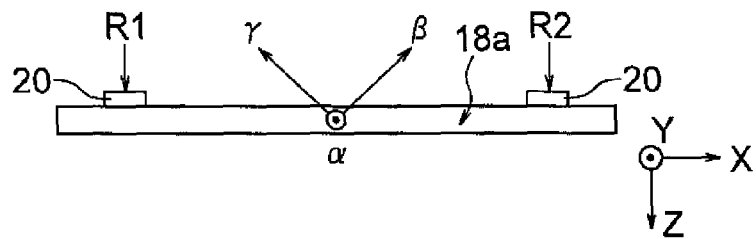
FIG. 9A to FIG. 9E are schematic views showing vibration modes.

Next, a vibration mode of the crystal plate 18a by the piezoelectric element 20 will be specified. In the present embodiment, a signal is transmitted from the vibration mode selecting circuit 80 shown in FIG. 3 to the antidust filter driving circuit 56 for example so as to drive one of the piezoelectric element 20 as shown in FIG. 9A by a driving signal R1 (a solid line), and to drive other piezoelectric element 20 by a driving signal R2 (a dashed line).

Figure 9B:
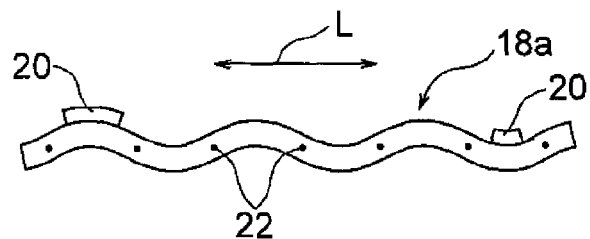
Figure 9C:
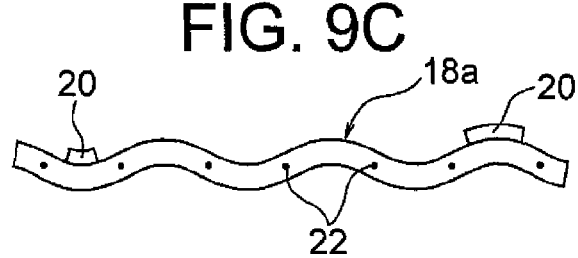
Figure 10:
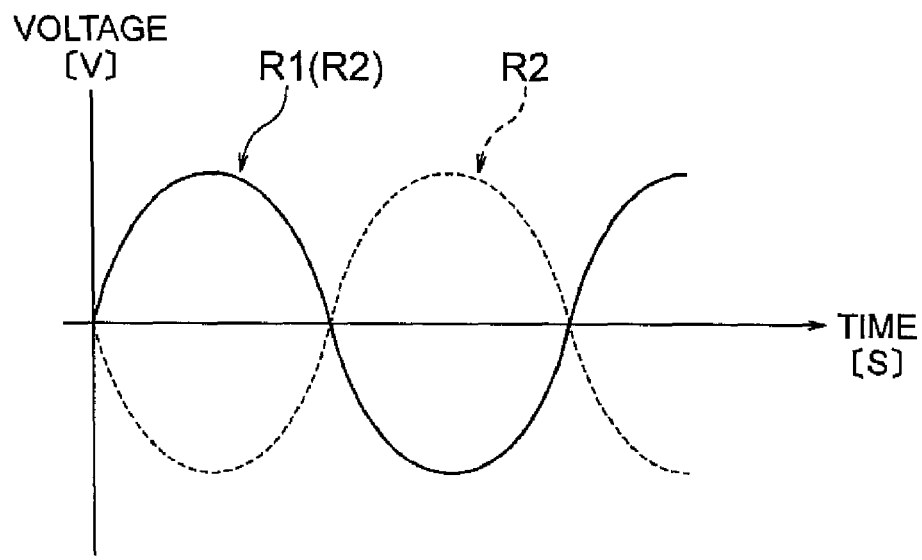
FIG. 10 is a graph showing an example of driving signals input into a pair of piezoelectric element.

As shown by a solid line and a dashed line of FIG. 10, in case that the driving signal R1 and the driving signal R2 are driving signals in the revere phase mutually, as shown in FIG. 9B and FIG. 9C, a pair of piezoelectric members 20 repeatedly shrink and expand in a reverse pattern mutually, and the crystal plate 18a vibrates at a sixth bending vibration mode along with a longitudinal direction L (perpendicular to the α-axis) of the crystal plate 18a. The sixth bending vibration mode is a kind of even vibration mode, which has six bending vibration mode loops.

There are seven nodes of the sixth bending vibration mode along the longitudinal direction L of the crystal plate 18a, and these nodes 22 become parallel to the α-axis. Positions of the vibration nodes 22 do not change when the vibration mode does not change as shown in FIG. 9B and FIG. 9C.

Also, in the case of changing the vibration mode, a signal is transmitted from the vibration mode selecting circuit 80 shown in FIG. 3 to the antidust filter driving circuit 56 so as to change the vibration mode. For example, as shown by a solid line in FIG. 10, the driving signal R1 and the driving signal R2 are designed as driving signals in the same phase mutually, and these are applied into a pair of the piezoelectric elements 20.

Figure 9D:
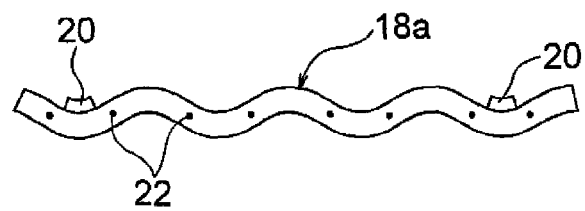
Figure 9E:
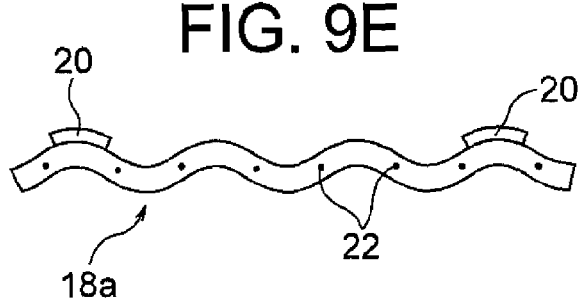

In this case, as shown in FIG. 9D and FIG. 9E, a pair of the piezoelectric elements 20 repeats shrinking and expanding at same pattern simultaneously so as to vibrate the crystal plate 18a at a seventh bending vibration mode along the longitudinal direction L of the crystal plate 18a. The seventh bending vibration mode is a kind of odd vibration mode, which has seven bending vibration mode loops.

Nodes 22 of the seventh vibration mode are eight nodes along the longitudinal direction L of the crystal plate 18a, and these nodes 22 become parallel to the α-axis. Positions of the nodes 22 do not change when the vibration mode does not change, as shown in FIG. 9D and FIG. 9E.

As shown in FIG. 9B to FIG. 9E, position of the nodes 22 at the crystal plate 18a can be changed by changing the vibration mode. As a result of this, dust remained on the positions of node 22 on the surface of the crystal plate 18a in a specific vibration mode will be blown away at other vibration mode at vibration acceleration because the positions of node 22 are changed. As a result, it becomes available to remove the dust at whole surface area of the crystal plate 18a.

For example, in the even order bending vibration modes as shown in FIG. 9B and FIG. 9C, since a center of the longitudinal direction L becomes the node of vibration, the acceleration for blowing away of the dust at a vicinity of the center of the longitudinal direction L may become smaller. On the other hand, in the odd order bending vibration modes as shown in FIG. 9D and FIG. 9E, since a center of the longitudinal direction L becomes loops of the vibration, the acceleration for blowing away of the dust at a vicinity of the center of the longitudinal direction L becomes extremely larger. Therefore, the dust can be removed effectively, by switching the even order bending vibration mode and the odd order bending vibration mode.

Note that, it is preferable to switch the even order bending vibration mode and the odd order bending vibration mode which have closer vibration modes numbers mutually. For example, in embodiments shown in the drawings, because the sixth and the seventh bending vibration modes are switched which are closer in vibration mode numbers, a portion being a node at one mode becomes a loop of the vibration at the other modes, and it is available to remove the dust effectively at an area other than the center portion of the longitudinal direction L.

In the present embodiment, pressing member 19 shown in FIG. 6 to FIG. 8 is compressing against a direction of the hermetic sealing member 16 from the outer face of the crystal plate 18a at a vicinity of the nodes 22 positioned at the outer side of each of the piezoelectric elements 20 arranged at both sides of the longitudinal direction L of the crystal plate 18a. The pressing member 19 compresses the both sides of the longitudinal direction L of the crystal plate 18a parallel to the nodes 22 of the vibration only, not compress both sides of a direction perpendicular to the nodes 22 of the bending vibration at the crystal plate 18a. This is not for inhibiting the bending vibration of the crystal plate 18a.

In the image pickup element unit 4 according to the present embodiment, the crystal plate 18a can be used as a part of the OLPS which contributes to reducing number of components to downsizing an apparatus, because newly added members for dust removal are not necessary.

Also, in the present embodiment, since the crystal plate 18a is a rectangular shape and the image pickup element 12 is a rectangular shape, it contributes to downsizing an apparatus due to a space where that the crystal plate (18) occupies for the dust prevention is small, compared to a circular shape glass.

Further, in the present embodiment, the one side crystal plate 18a which constitutes a part of OPLF is provided to the optical member element 30 of OPLF except for the crystal plate 18a with predetermined intervals which corresponds to a thickness of the hermetic sealing member 16. Therefore, as compared from the case of vibrating whole OPLF including the crystal plate 18a and the optical member element 30, the dust prevention effect is further increased and it contributes to energy saving by making vibration only the crystal plate 18a, because it is available to increase vibration acceleration with lower applied energy.

Furthermore, in the present embodiment, since the dust removal function is exerted by using the bending vibration of the crystal plate 18a (driving frequency is tens of kHz to several hundreds of kHz) and not by vibration of a surface elasticity wave of the crystal plate (driving surface is several MHz), it is superior in the dust prevention effect.

Note that, in the above mentioned embodiment, although the crystal plate 18a is a rectangular shape and the short side of the rectangular shape is substantially parallel to the α-axis of the crystal, the long side of the rectangular may be parallel to the α-axis. Also, in the above mentioned embodiment, although a pair of the piezoelectric elements 20 is arranged on both sides of the long side of the rectangular shape crystal plate 13a, they may be arranged on both sides of the short side.

Also, in the other embodiment, it may be constituted that the piezoelectric element 20 is adhered on a back surface of the crystal plate 18a at both sides of the longitudinal direction L of the crystal plate 18a, by enlarging a width of the longitudinal direction L of the crystal plate 18a with respect to the case 17 shown in FIG. 6 to FIG. 7.

Note that, in the above mentioned embodiments, although it is specified by using an imaging device to operate image blurring compensation by moving image pickup element, it is not limited thereto. For example, it may be an imaging device to operate image blurring compensation by moving lens, also, it may be an imaging device having no image blurring compensation function.

Further, in the above mentioned embodiment, although a pair of the piezoelectric elements 20 arranged on the both side of the longitudinal direction L of the crystal plate 18a are constituted by piezoelectric elements having same polarization direction mutually, they may be constituted by piezoelectric elements having different polarization direction mutually. In this case, when the driving signal R1 and the driving signal R2 in the same phase mutually are applied into a pair of the piezoelectric elements 20, the crystal plate 18a vibrates under the even bending vibration mode. Also, in case that the driving signal R1 and the driving signal R2 which are signals in the reverse phase mutually are applied to a pair of the piezoelectric elements 20, the crystal plate 18a vibrates under the odd bending vibration mode.

Further, in the above mentioned embodiment, the crystal plate 18a are vibrated under the sixth bending vibration mode and the seventh bending vibration mode by switching, as a bending vibration mode, it is not limited to these multiple modes, the crystal plate 18a may be vibrated by switching the other even order vibration mode and the odd order vibration mode. However, as the vibration modes, sixth to eleventh vibration modes will be preferred.

Also, it will be preferred to switch the even order vibration mode and the odd order vibration mode more than one time at least one of a period from putting an imaging device power on to shooting picture.

Further, as a modified example of the above mentioned embodiment, the crystal plate 18a shown in FIG. 7 may be composed of a transparent protecting glass plate, and the optical member element 30 may be composed of four sheets of laminated plate which constitutes OPLF.

Third Embodiment

Figure 11:
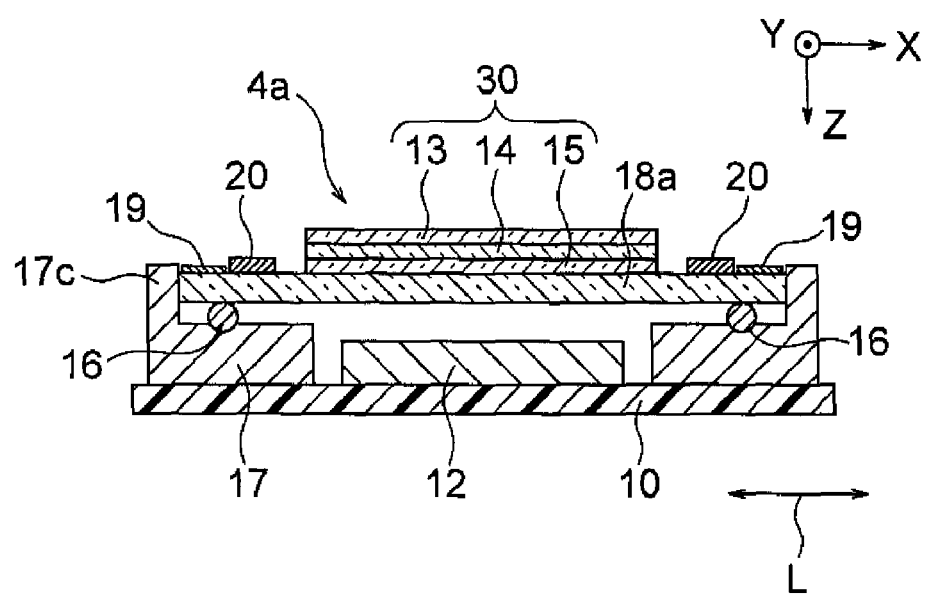
FIG. 11 is a schematic cross sectional view of an imaging device according to other embodiments of the present invention.

This third embodiment is similar with the second embodiment other than that, as shown in FIG. 11, a cross sectional constitution of an image taking element unit 4a differs a cross sectional constitution shown in FIG. 7. Therefore, specification of common portion therewith will be omitted and only difference points will be specified.

In the present embodiment, OPLF is composed by directly laminating a crystal plate 13, an infrared ray absorbing glass plate 14 and a crystal wavelength plate 15 and a crystal plate 18a. A width of the longitudinal direction L of the crystal plate 18a is enlarged with respect to a width of the other optical member elements 30. Then, the respective piezoelectric elements 20 are equipped on both side faces of the longitudinal direction L of the crystal plate 18a to which the optical member element 30 is not formed.

In the image pickup unit 4a according to the present embodiment, it is available to reduce whole size further, as compared from the image pickup element 4a of the second embodiment shown in FIG. 7. Other function and effects are similar to the above mentioned second embodiment.

Note that, in the third embodiment, although the optical member element 30 is equipped on the same side with the piezoelectric element 20 at a surface of the crystal plate 12a, it may be laminated on the image pickup element 12 side (an inside of the unit 4a) which is opposite to the piezoelectric element 20.

Also, as a modified example of the third embodiment, the crystal plate 13, the infrared ray absorbing glass plate 14, the crystal wavelength plate 15 and the crystal plate 18a, all of them having the same width of the longitudinal direction L may be laminated directly to constitute OPLF, and each piezoelectric elements 20 may be equipped respectively on both sides of a surface of the longitudinal direction L of the crystal plate 13.

Fourth Embodiment

Figure 12A:
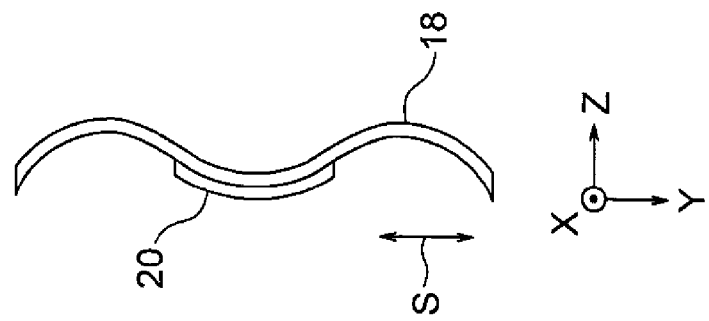
FIG. 12A is a plane view of a light transmissive member in an imaging device according to further other embodiments of the present invention.
Figure 12B:
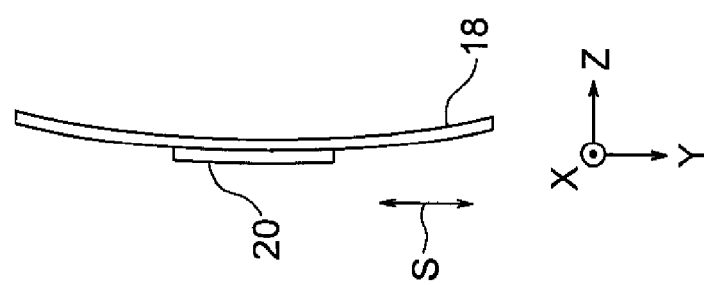
FIG. 12B and FIG. 12C are cross sectional views along a line B-B shown in FIG. 12A.
Figure 12C:
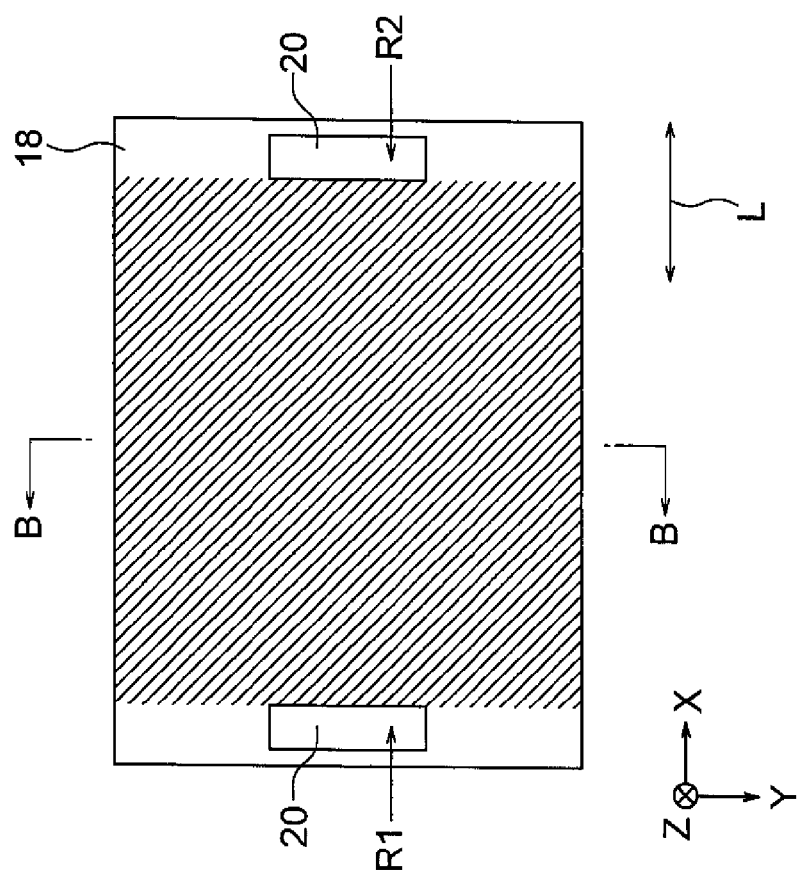

In this fourth embodiment, as shown in FIG. 12A to FIG. 12C, a pair of the piezoelectric elements 20 is equipped on both sides of the longitudinal direction (X-axis) at a surface of a transparent protection glass plate 18. In addition, in the present embodiment, a mode so as to cause vibration of the protection glass plate 18 at an odd order bending vibration along with a surface of a short side direction (Y-axis) which is perpendicular to the longitudinal direction (X-axis) of the protection glass plate 18 is available. Other constitutions are same with the second embodiment, specification of common portion therewith will be omitted and only difference points will be specified.

In the present embodiment, the protection glass plate 18 is an article substituted for the crystal plate 18a of the second embodiment shown in FIG. 7. A driving signal R1 and a driving signal R2, which are signals in the reverse phase each other, are applied to a pair of the piezoelectric elements 20 equipped on both sides of the longitudinal direction L of the protection glass plate 18. As a result, as shown in FIG. 9B and FIG. 9C for example, it can be vibrated at an even vibration mode having node 22 of vibration which is parallel along Y-axis (Y-axis is perpendicular to the longitudinal direction L).

Then, the protection glass plate 18 can be vibrated at an odd order vibration mode so as to occur nodes which is parallel along X-axis (X-axis is parallel to the longitudinal direction L) by applying a driving signal R1 and a driving signal R2 in the same phase mutually at a frequency even which is different from a frequency of vibration at the even order vibration mode, as shown in FIG. 12B or FIG. 12C. The other function and effects are similar with the above mentioned first embodiment.

Fifth Embodiment

Figure 13:
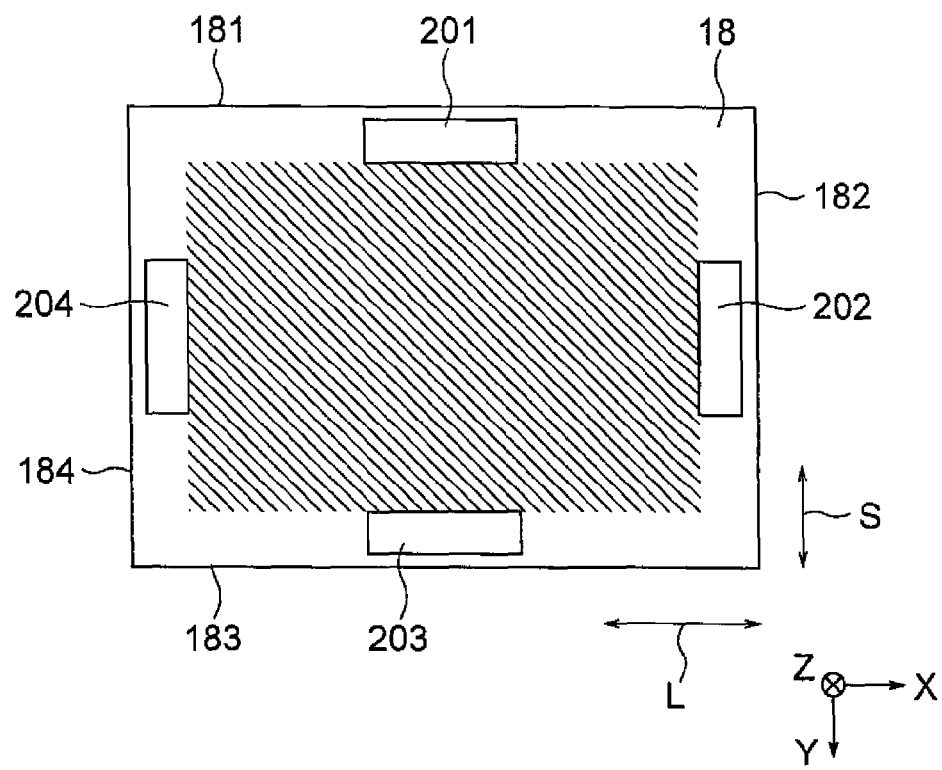
FIG. 13 to FIG. 14 are plane views of an imaging device according to further other embodiment of the present invention.

In this fifth embodiment shown in FIG. 13, a protection glass 18 includes a first side 181, a second side 182 which crosses with the first side 181, a third side 183 positioned at an opposite side of the first side 181 and a fourth side 184 positioned at an opposite side of the second side 182.

A first vibration member 201 is provided adjacent to the first side 181, a second vibration member 202 is provided adjacent to the second side 182, a third vibration member 203 is provided adjacent to the third side 183, a fourth vibration member 204 is provided adjacent to the fourth side 184.

For example, when it is switched to the first driving mode by the vibration mode selecting circuit 80 (refer to FIG. 3), the first vibration member 201 and the third vibration member 203 are driven by the anti dust filter driving circuit 56 (refer to FIG. 3); when it is switched to the second driving mode, the second vibration member 202 and the fourth vibration member 204 are driven by the antidust filter driving circuit 56.

In the fifth embodiment, it may be constituted that a pair of the piezoelectric elements 202 and 204 will generate vibration modes shown in FIG. 12B and FIG. 12C, the other pair of the piezoelectric elements 201 and 203 will generate vibration modes shown in FIG. 9B to FIG. 9E. Other constitutions are similar with the first embodiment and the third embodiment, thus, specification of common portion therewith will be omitted.

Sixth Embodiment

Figure 14:
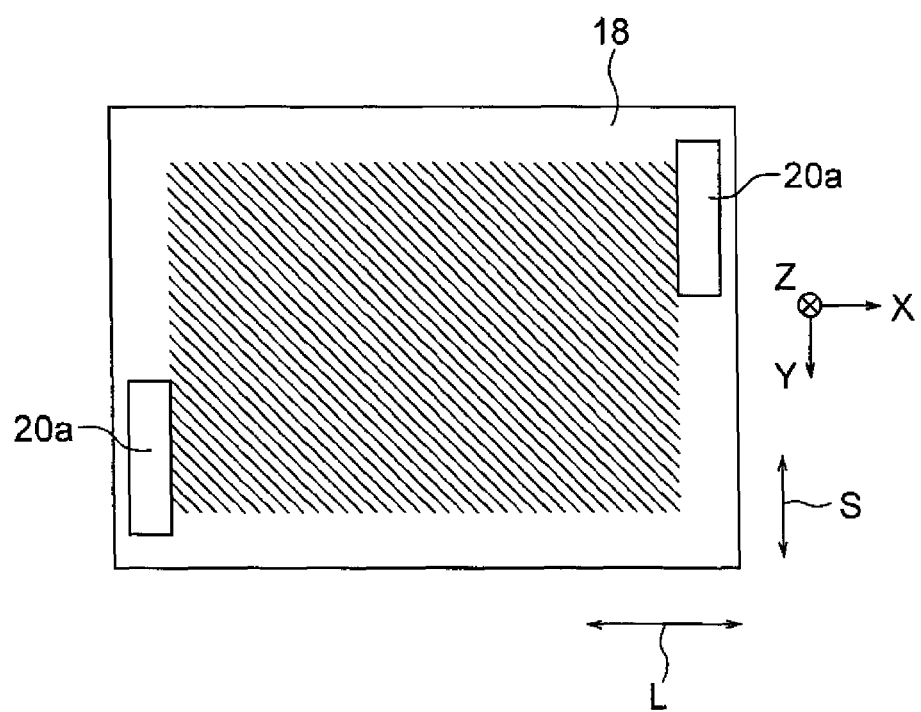

In this sixth embodiment, as shown in FIG. 14, a pair of the piezoelectric elements 20 is equipped on a center of both sides of the longitudinal direction (a first direction) L at a surface of a transparent protection glass plate 18 with position aberration to the short side direction (a second direction). In this embodiment, a pair of the piezoelectric elements 20a will easily generate the even vibration mode, when nodes of the vibration cause vibration mode parallel to the longitudinal direction L (X-axis direction) as shown in FIG. 12B and FIG. 12C. Other constitutions are similar with the second embodiment and the fourth embodiment, thus, specification of common portion therewith will be omitted.

Seventh Embodiment

Figure 15:
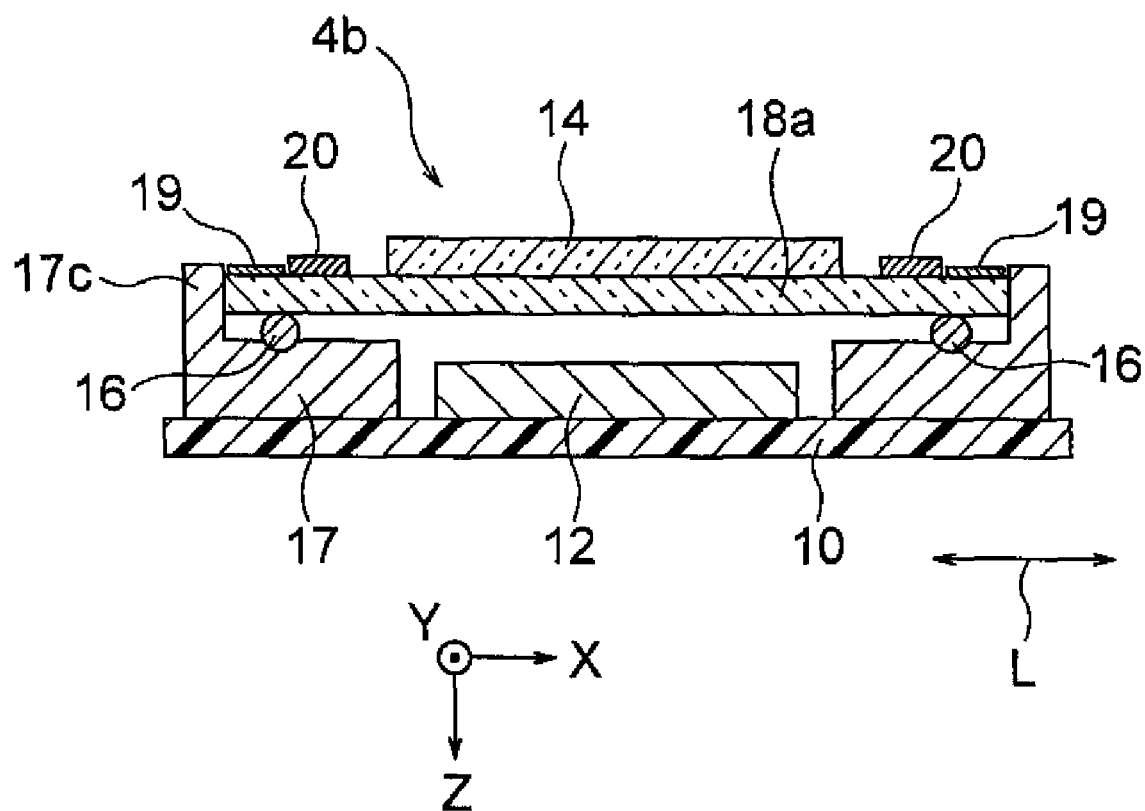
FIG. 15 is a cross sectional view of an imaging device according to further other embodiment of the present invention.

As shown in FIG. 15, this seventh embodiment is modified version of the third embodiment shown in FIG. 11, and it is similar with the third embodiment other than a cross sectional constitution which differs from the embodiment shown in FIG. 11, specification of common portion therewith will be omitted and only different portion will be specified.

In this embodiment, only a crystal plate 18a and an infrared ray absorbing glass plate 14 are laminated directly to constitute OPLF, and a width of a longitudinal direction L of a crystal plate 18a is enlarged with respect to the width of the infrared ray absorbing glass plate 14. And, each piezoelectric element 20 is respectively equipped on both side of a surface of the longitudinal direction L of the crystal plate 18a where the infrared ray absorbing glass plate 14 is not formed.

In an image taking element unit 4b according to the present embodiment, as compared from the image taking element unit 4a according to the third embodiment shown in FIG. 11, whole size can be downsized further as well as reducing the cost for OPLF. Other constitutions are similar with the second embodiment and the third embodiment.

Note that the present invention is not limited to the above explained embodiment and can be modified within a scope of the present invention.

For example, as a light transmissive member having anti-dust character is not limited to the glass plate 18, other light transmissive member such as lens, filters and the like may be used. Also, as a vibration member, vibration member other than piezoelectric elements may be used. Further, the constitutions of the above mentioned first to seventh embodiments may be modified suitably, and at least one portion of the first embodiment may be combined with at least one portion of the constitution of the second to the seventh embodiment as an embodiment of the present embodiment.

The invention claimed is:

1. An imaging device comprising:
    a laminated member arranged to face an image pick-up portion that obtains an image from an optical system, and comprised of a plurality of light transmissive layers that are laminated to each other and transmit light;
    a vibration member that causes bending vibration of said laminated member, the vibration member being provided on the laminated member;
    a driving portion connected electrically to said vibration member so as to drive said vibration member;
    a case on which said laminated member is arranged;
    a sealing member that has elastic and is arranged between said laminated member and said case; and
    a pressing member that presses said laminated member toward said sealing member and is arranged at a nearer edge side of said laminated member than said vibration member, wherein
    at least one of the light transmissive layers has a non-laminated part that is not laminated by the other light transmissive layers,
    said vibration member is mounted on said non-laminated part, and
    said driving portion drives said vibration member and causes bending of said laminated member at a first frequency along a first direction, and bending of said laminated member at a second frequency, which is different from said first frequency, along a second direction that crosses said first direction.

2. The imaging device as set forth in claim 1, wherein:
said driving portion switches an odd vibration mode which causes bending vibration of said laminated member at a bending mode whose number of vibration loops becomes odd number and an even vibration mode which causes bending vibration of said laminated member at a bending mode whose number of vibration loops becomes even number;
said odd vibration mode is a bending mode along a first direction; and
said even vibration mode is a bending mode along a second direction that is different from the first direction.

3. The imaging device as set forth in claim 2, wherein;
said vibration member is driven so as to occur vibration nodes which are parallel to said second direction at said light transmitting member in said odd vibration mode, and said vibration member is driven so as to occur vibration nodes which are parallel to said first direction at said light transmitting member in said even vibration mode.

4. The imaging device as set forth in claim 2, wherein;
said vibration member comprises a first vibration portion and a second vibration portion which are spaced each other and provided on said laminated member.

5. The imaging device as set forth in claim 4, wherein;
said driving portion provides a first driving signal to said first vibration portion, and provides a second driving signal to said second vibration portion,
when one of said even vibration mode and said odd vibration mode, said first driving signal and said second driving signal are signals in the same phase, when another of said even vibration mode and said odd vibration mode, said first driving signal and said second driving signal are signals in the reverse phase.

6. The imaging device as set forth in claim 5, wherein;
said first vibration portion and said second vibration portion are equipped on said laminated member so as to be the same piezoelectric properties in a direction opposed to each other,
when said odd vibration mode, said driving portion provides said first driving signal and said second driving signal which are signals in the same phase to said first vibration portion and said second vibration portion,
when said even vibration mode, said driving portion provides said first driving signal anc said second driving signal which are signals in the reverse phase to said first vibration portion and said second vibration portion.

7. The imaging device as set forth in claim 4, wherein;
said vibration portions are provided at symmetry site on a face of said laminated member substantially vertical to an optical axis of said optical system.

8. The imaging device as set forth in claim 1, wherein;
said laminated member is an optical low-pass filter.

9. An optical device comprising the imaging device as set forth in claim 1.

10. The imaging device as set forth in claim 1, wherein said laminated member has a rectangular shape having a pair of long sides and a pair of short sides.

11. The imaging device as set forth in claim 1, wherein said non-laminated part is provided at each of both ends of the long sides.

12. The imaging device as set forth in claim 1, wherein said driving portion operates the bending vibration of said first frequency and the bending vibration of said second frequency at a different timing.

* * * * *